Aug. 29, 1967 R. S. DAVIS ETAL 3,339,009
BUS DUCT WITH REMOVABLE JOINT STACK
Filed Feb. 23, 1965 8 Sheets-Sheet 1
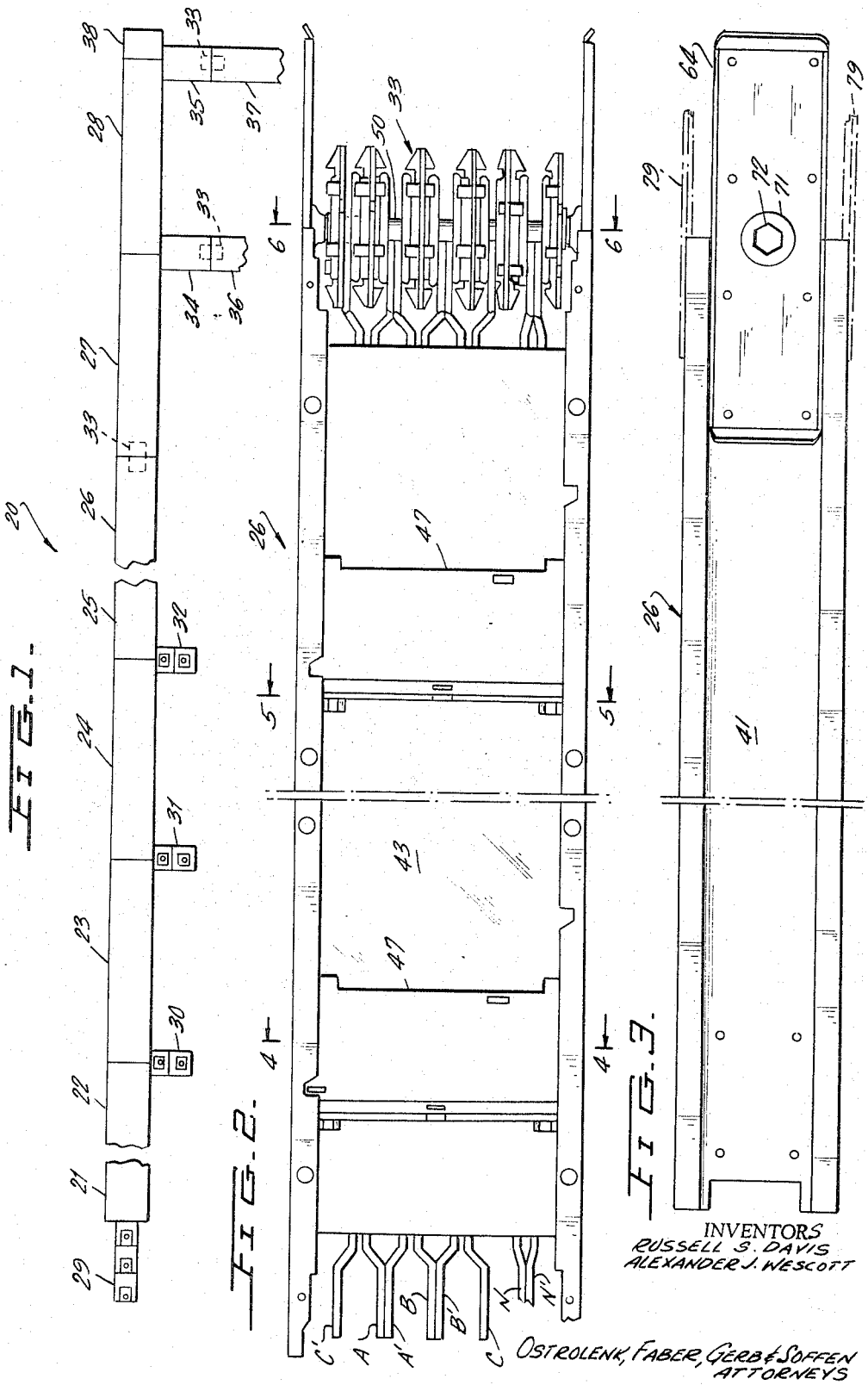
INVENTORS
RUSSELL S. DAVIS
ALEXANDER J. WESCOTT
OSTROLENK, FABER, GERB & SOFFEN
ATTORNEYS

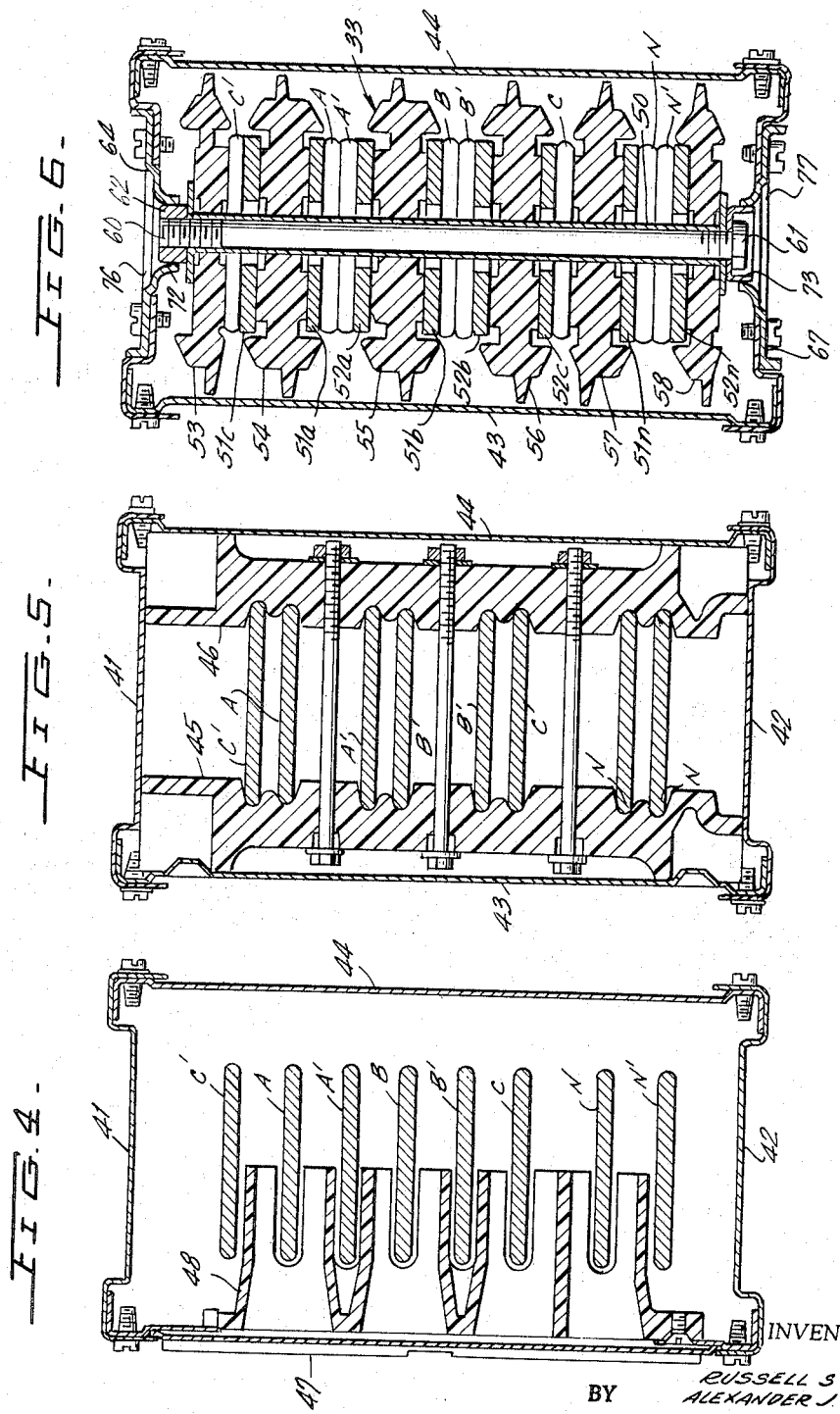

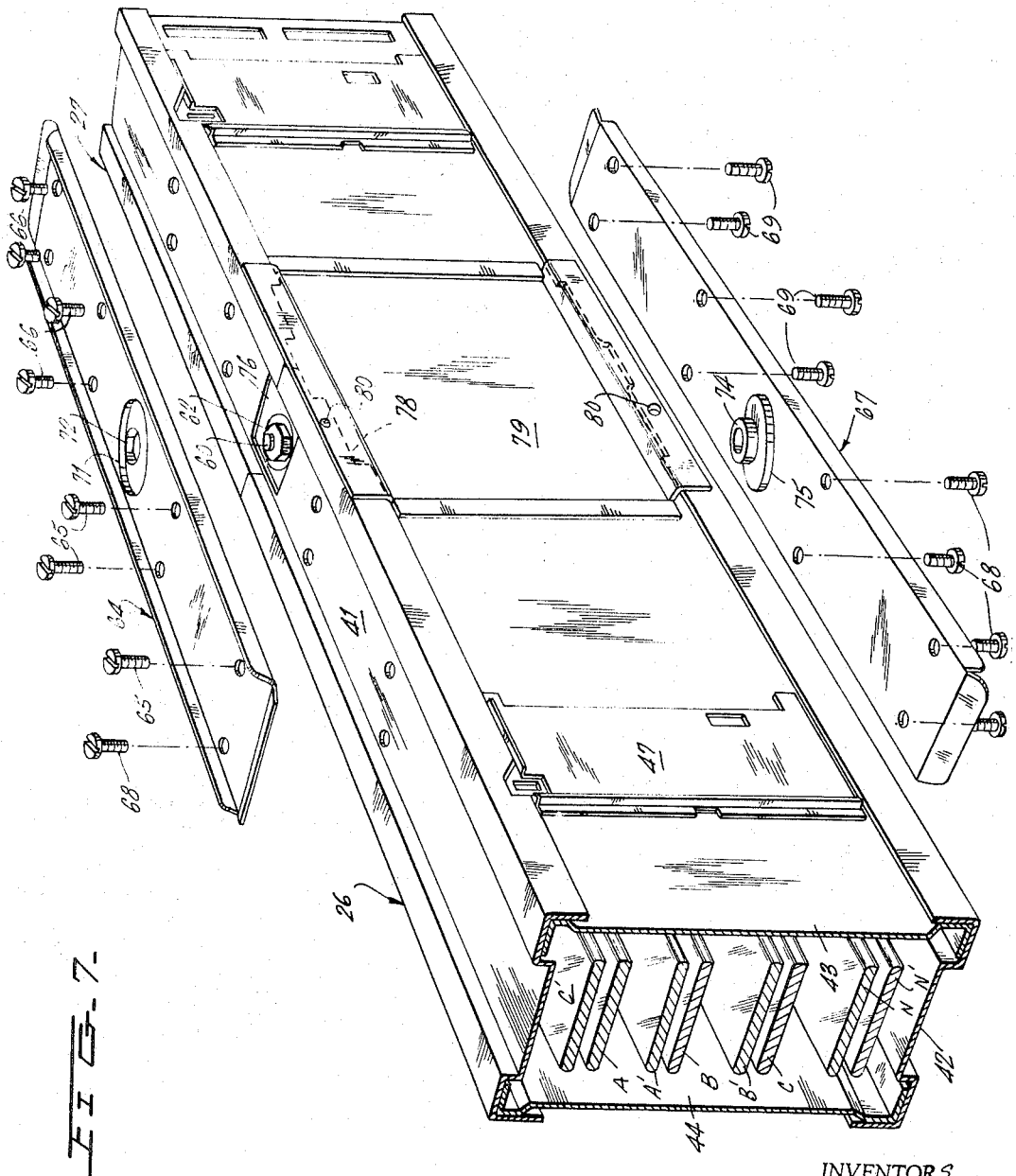

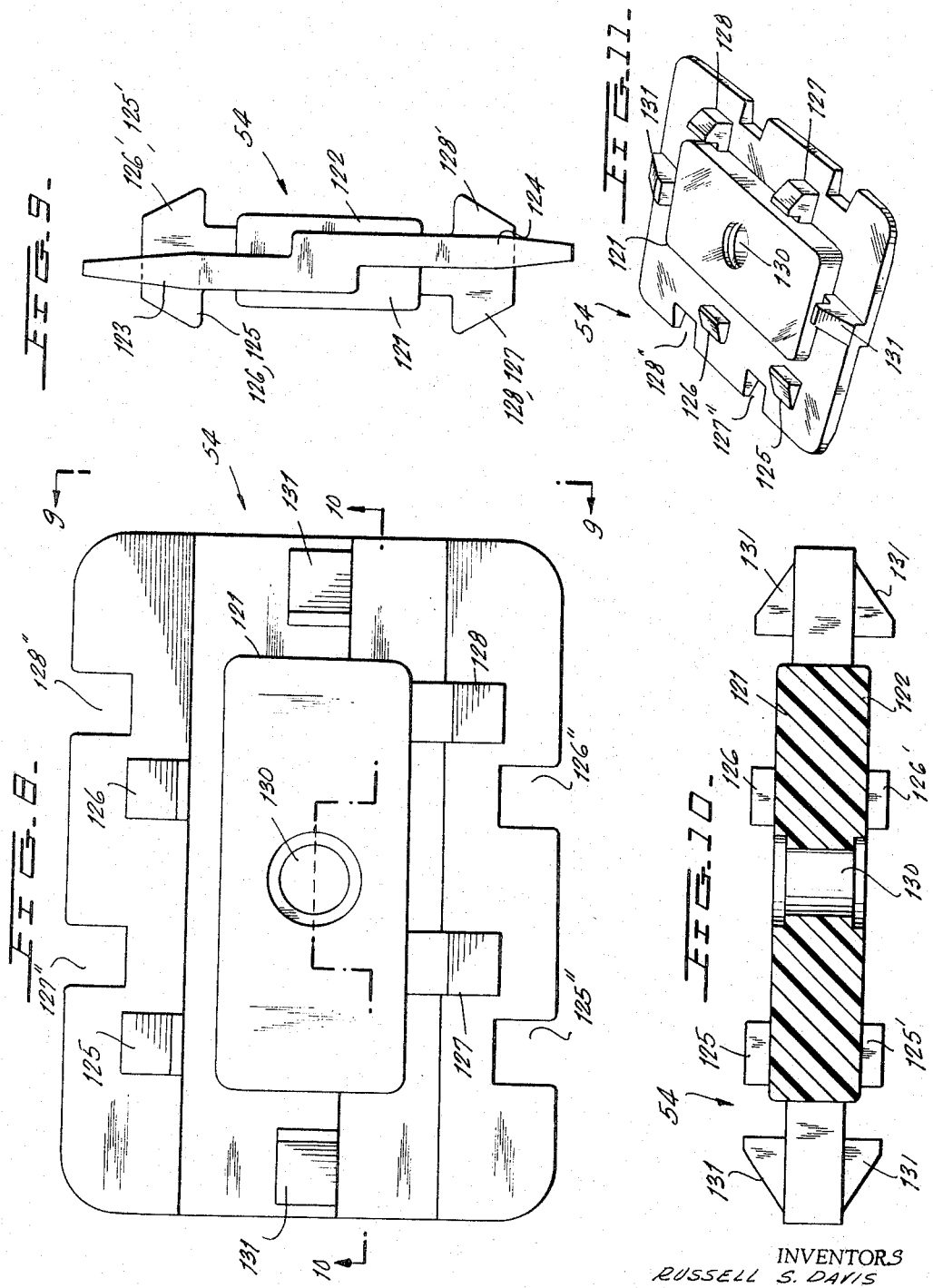

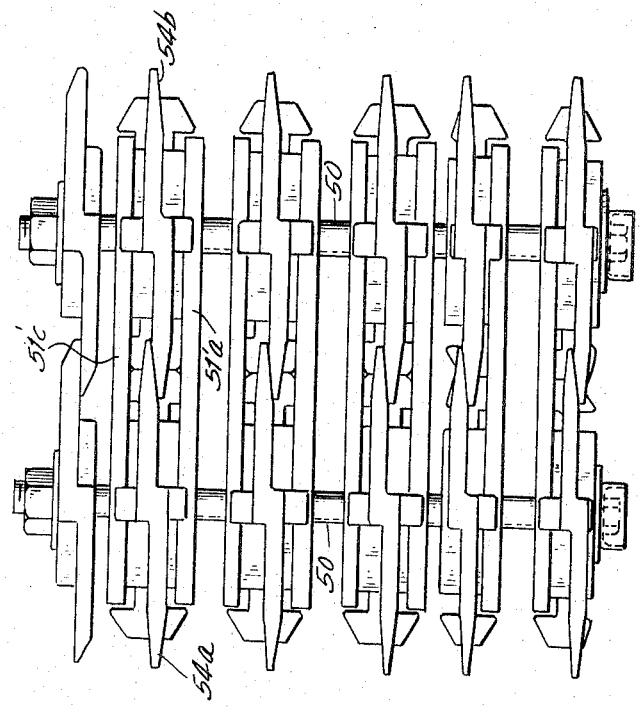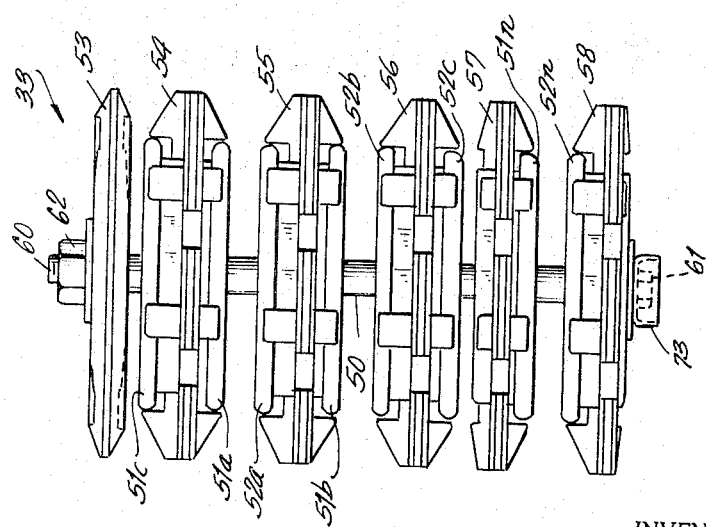

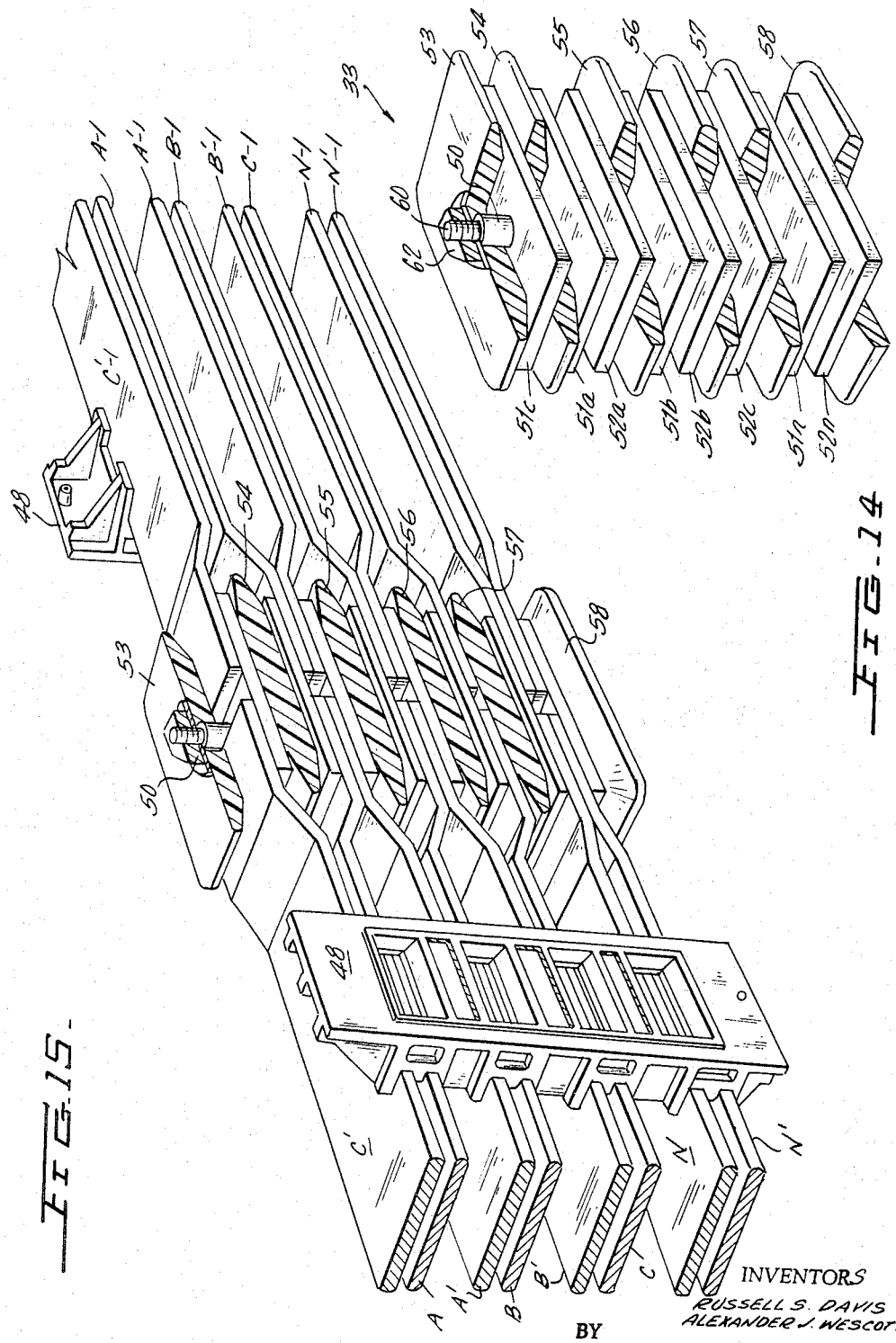

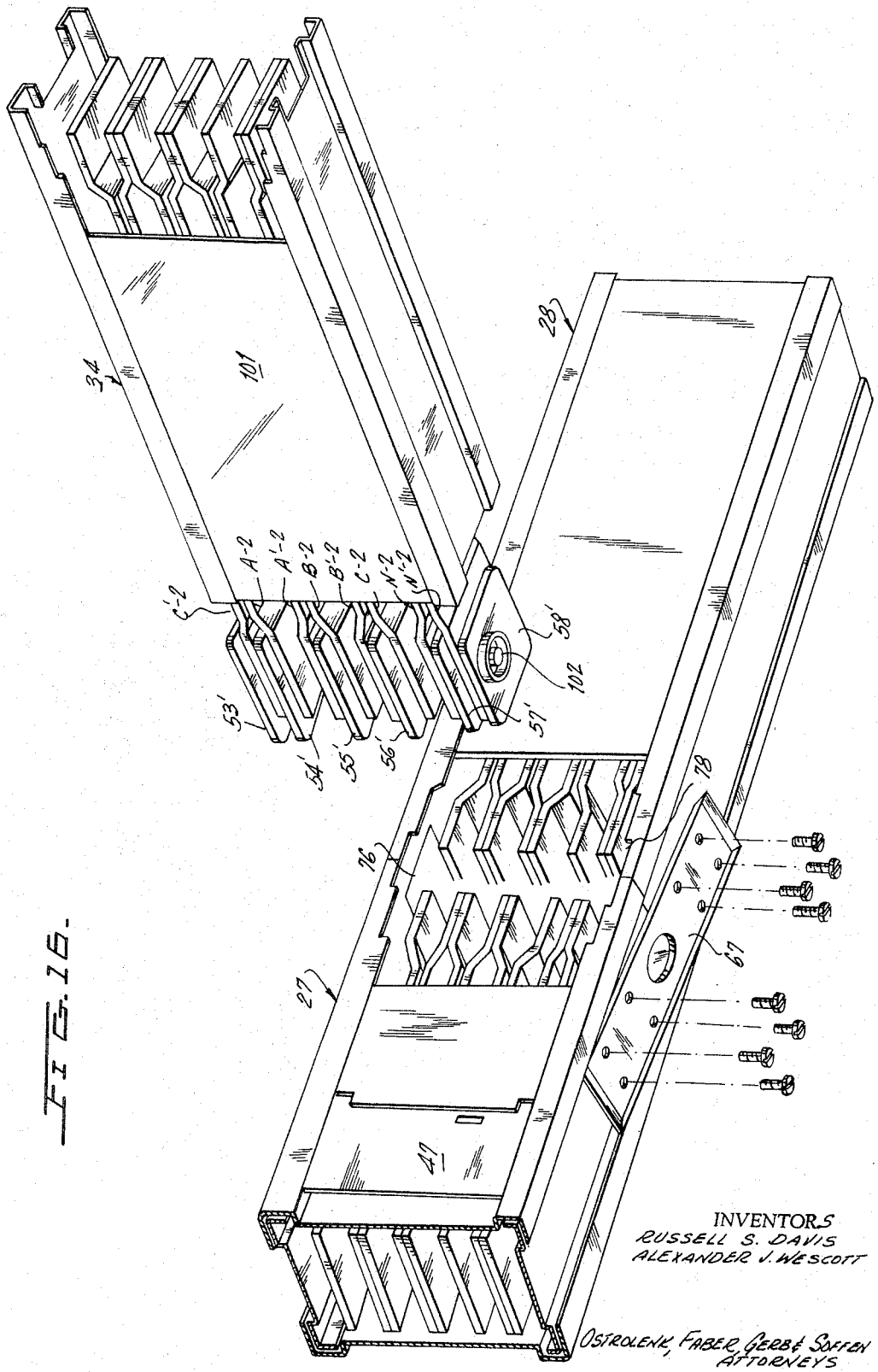

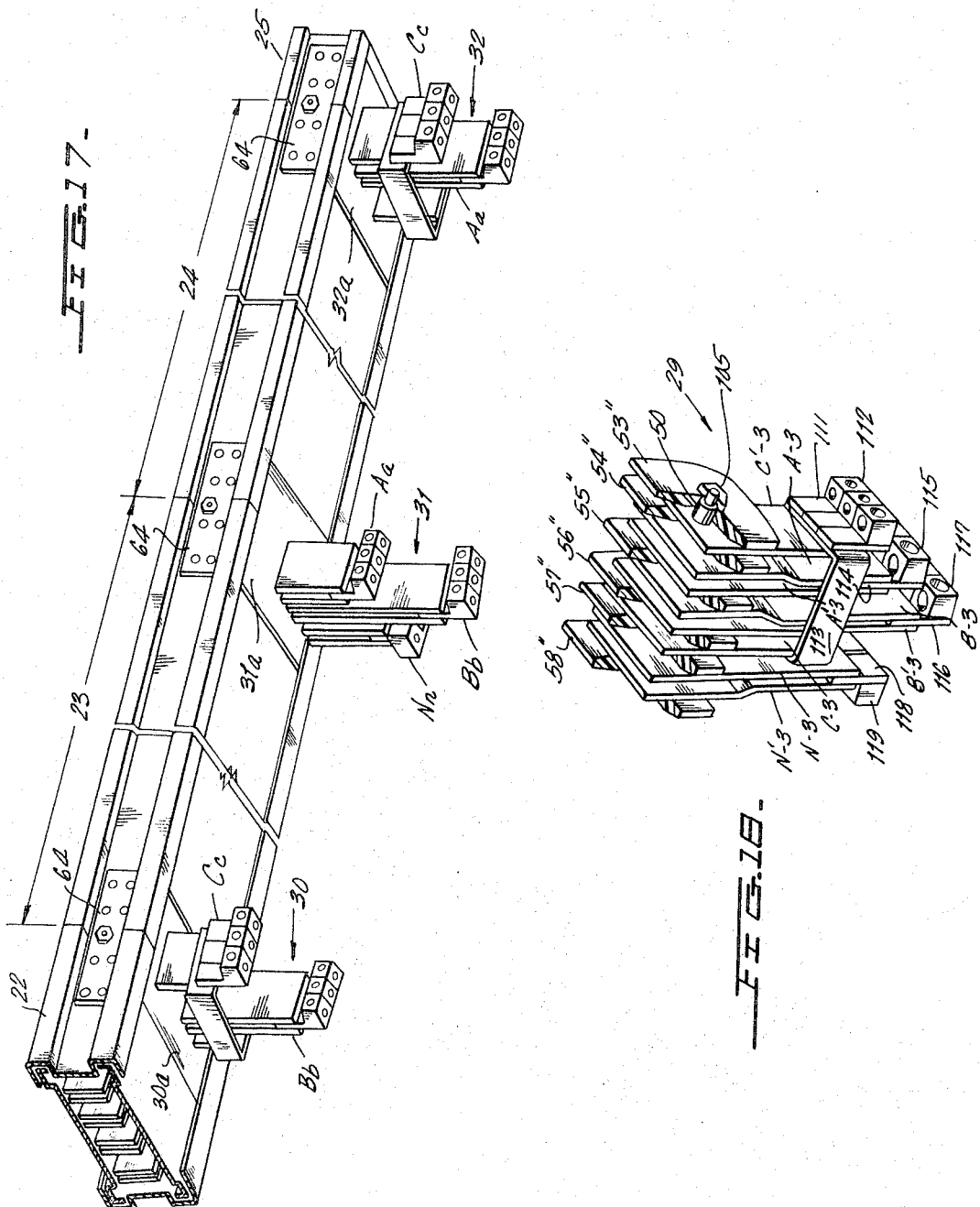

United States Patent Office 3,339,009
Patented Aug. 29, 1967

3,339,009
BUS DUCT WITH REMOVABLE JOINT STACK
Russell S. Davis, Detroit, and Alexander J. Wescott, Grosse Pointe, Mich., assignors to I-T-E Circuit Breaker Company, Philadelphia, Pa., a corporation of Pennsylvania
Filed Feb. 23, 1965, Ser. No. 434,573
12 Claims. (Cl. 174—72)

ABSTRACT OF THE DISCLOSURE

The bus bars of adjacent bus duct sections are electrically connected by a joint assembly including a plurality of insulators and a plurality of conducting plates each mounted to a through clamping bolt extending through an insulating sleeve. The assembly is movable into and out of its operative position as a unitary structure. By providing the joint assembly with a through clamping bolt such joint assembly may be removed without moving the duct sections formerly connected thereby and such assembly may be replaced by one of a plurality of new assemblies constructed to provide power tapping means or T or L forming duct sections. The end of each type of new assembly includes a through bolt and stacked insulators arranged to cooperate with conductors of such new assembly to electrically connect the adjacent bus duct sections.

---

This invention relates to electrical distribution systems in general and more particularly to bus duct of novel construction in which the duct sections are electrically connected by a straight through joint means which is readily removable and replaceable by power tap and/or junction forming sections.

A bus duct type electrical distribution system consists of a plurality of spaced generally parallel bus bars disposed within an elongated metal housing. For convenience in transportation and storage prior to installation, bus duct is manufactured in sections of convenient length. The sections are mounted end-to-end with the bus bars of adjacent sections being electrically connected by a straight through joint means. U.S. Patent No. 3,104,276, issued Sept. 17, 1963 to J. B. Cataldo et al., entitled "Through-Bolt Joint for Bus Duct," illustrates a joint means for electrically connecting adjacent sections of the bus duct.

Present-day bus duct constructions are such that installation of a system is relatively convenient. However, certain inconveniences are still present especially when it becomes necessary to provide L or T joints. Further, the provision of power feed-in and/or takeoff taps is often inconvenient. Prior art attempts at reducing inconveniences of installation have unduly limited the locations for making L's, T's and taps, and/or have required the provision of expensive and complicated adapters for these purposes.

In so-called paired-phase or low reactance bus duct structures, even straight-through joints, present problems, and the problems of L's, T's and power taps are more complicated. U.S. Patent 2,287,502, issued June 23, 1942 to A. A. Torgesen et al., entitled "Electrical Distribution System," illustrates a paired-phase or low reactance bus duct structure.

The instant invention overcomes all of these difficulties of the prior art by providing a structure in which the bus duct sections are electrically connected by removable joint stacks. The bus bars of adjacent sections are mounted with a space between the ends thereof so that the joint stack is readily removable without moving either one or both of the duct sections. Further, the spacing between bus bars of adjacent duct sections permits the ready insertion of L and T forming sections as well as power taps in place of a joint stack.

The straight through joint means, L and T forming sections and the power tapping sections each include a joint stack portion constructed according to the general principles of the through-bolt construction illustrated in the aforesaid Patent 3,104,276. More particularly, a single bolt means extending through an insulating tube is utilized to provide contact pressure at the joint between adjacent duct sections as well as between one or more duct sections and a power tap, an L forming section and/or a T forming section.

The insulators of the removable joint stack are so constructed that two insulator stacks may readily be mounted side-by-side as is necessary in duct constructions for very high current ratings in which a double stack of bus bars is provided. This side-by-side mounting of removable joint stacks is especially convenient in view of the fact that the insulators are constructed with cooperating formation so positioned that the insulators of one of the joint stacks interlock with the insulators of the adjacent joint stack.

Accordingly, a primary object of the instant invention is to provide a novel construction for a bus duct type electrical distribution system.

Another object is to provide a bus duct system constructed in a manner such that electrical joint stacks are removable without moving any duct sections.

Still another object is to provide a bus duct system in which the joint stacks may be removed, without moving the duct sections, and replaced by a junction forming section or a power tapping section.

A further object is to provide a novel bus duct system to which branch runs may readily be added.

A still further object is to provide removable joint stacks of novel construction having formations enabling the insulators of one stack to interlock with the insulators of an adjacent stack.

These as well as other objects of this invention shall become readily apparent after reading the following description of the accompanying drawings in which:

FIGURE 1 is a fragmentary plan view in schematic form, showing an electrical distribution system constructed in accordance with the teachings of the instant invention.

FIGURE 2 is a side elevation of the duct sections of the system of FIGURE 1.

FIGURE 3 is a plan view of a duct section of FIGURE 2.

FIGURES 4, 5 and 6 are cross-sections taken through lines 4—4, 5—5 and 6—6 respectively of FIGURE 2, looking in the directions of the respective arrows.

FIGURE 7 is a fragmentary perspective illustrating the manner in which adjacent duct sections are secured to one another.

FIGURE 8 is a plan view of one of the joint stack insulators.

FIGURE 9 is a side elevation of the joint stack insulator of FIGURE 8, looking in the direction of arrows 9—9 of FIGURE 8.

FIGURE 10 is a cross-section taken through lines 10—10 of FIGURE 8, looking in the direction of arrows 10—10.

FIGURE 11 is a perspective of the joint stack insulator of FIGURE 8.

FIGURE 12 is a side elevation of a joint stack.

FIGURE 13 is a side elevation showing a joint stack for a double bar high current arrangement.

FIGURE 14 is a perspective of the joint stack of FIGURE 12.

FIGURE 15 is a fragmentary perspective illustrating the manner in which the joint stack of FIGURE 14 electrically connects bus bars of adjacent duct sections.

FIGURE 16 is an exploded perspective illustrating the manner in which a junction forming section is mounted to provide a T joint.

FIGURE 17 is a perspective illustrating portions of a duct run having different power tap sections connected at different joints between duct sections.

FIGURE 18 is a perspective of one type of a power tap section.

It is noted that in FIGURES 14, 15, 16 and 18, for the sake of clarity, the insulators are shown without their interlocking formations.

Now referring to the figures, electric distribution system 20 of FIGURE 1 includes a plurality of bus duct sections 21–28, and intermediate sections, not shown, connected in a straight run. Power tap section 29 (FIGURE 18) is connected at the left end of section 21 while power tap section 30 is at the joint between duct sections 22, 23, power tap section 31 is at the joint between duct sections 23, 24 and power tap section 32 is at the joint between sections 24 and 25. Removable joint stack 33 electrically connects duct sections 26, 27; junction forming section 34 (FIGURE 16) connects duct sections 27, 28 in a T arrangement with duct section 36, while junction forming section 35 at the right end of duct section 28 connects this duct section to duct section 37 to form an L arrangement. Adapter 38 provides a closure for the right end of duct section 28 and provides spacing members (not shown) for the electrical joint means, as will hereinafter become apparent.

Since bus duct sections 21 through 28, 36 and 37 are of identical construction, for the sake of brevity only section 26 will be described in detail with particular reference to FIGURES 2 through 7. Bus duct section 26 is provided with an elongated housing of generally rectangular cross-section having top and bottom walls 41, 42, respectively, connected by side walls 43, 44. The edges of walls 41 through 44 are provided with offsets and flanges for the purpose of strengthening the structure and interlocking the wall members 41 through 44.

Eight elongated flat bus bars are disposed within housing 41–44 in a ladder-type arrangement with the faces thereof generally parallel to walls 41, 42. These bus bars are also arranged in a so-called paired-phase, low impedance configuration, the principles of which are explained in the aforesaid U.S. Patent No. 2,287,502.

More particularly, duct section 26 is to be connected to a three phase power source. Both bus bars A, A' are connected to one phase of the power source, bus bars B, B' are connected to a second phase of the power source, and bus bars C, C' are both connected to the third phase of the power source. Except at the very ends of duct section 26, bus bars C', A are positioned in close proximity to one another as a first pair, bus bars B, A' are positioned in close proximity to one another as a second pair, and bus bars B', C are positioned in close proximity to one another as a third pair. It is noted that the spacing between pairs is considerably greater than the spacing between the bus bars constituting each pair. In addition, a pair of neutral bus bars N, N' are interposed between bus bar C and bottom housing wall 42. At both ends of duct section 26 the bus bars constituting each of the pairs are offset away from one another for a reason which will hereinafter become apparent. That is, the offset of bus bar C' is away from bus bar A, the offset of bus bar B is away from bus bar A', and the offset of bus bar B' is away from bus bar C with these offsets being such that the ends of bus bars A, A' contact one another and the ends of bus bars B, B' contact one another. Neutral bars N, N' are spaced from one another for substantially their entire lengths but at the ends thereof are offset into contact with one another.

A plurality of insulating members 45, 46 (FIGURE 5) disposed within housing 41–44 and spaced along the length thereof, maintain the spaced insulating relationships between the bus bars at points intermediate the ends thereof.

Side walls 43, 44 are each provided with a plurality of plug-in openings normally closed by slidable covers 47. As seen in FIGURE 4, molded insulator 48 is positioned within housing 41–44 immediately behind each of the openings covered by the covers 47. Insulators 48 are provided with a plurality of passages through which the fingers of a plug-in unit may be projected into engagement with bus bars A, B, C, N when the cover 47 over a particular opening is moved away from such opening.

As seen in FIGURE 15, the bus bars of duct section 27 which are positioned in axial alignment with the bus bars of duct section 26 are given the same reference numerals with the addition of the suffix (–1). With the housings of duct sections 26–27 mounted such that the ends thereof are in abutting relationship (FIGURE 7), the ends of the bus bars of duct section 26 are spaced from the ends of the bus bars of duct section 27 (FIGURE 15). This provides a space through which insulating tube 50 of joint stack 33 (FIGURES 6, 12, 14) is movable in a direction transverse to the longitudinal axis of duct sections 26, 27 in a plane parallel to the planes in which the faces of the bus bars lie.

Joint stack 33 includes a plurality of plate-like insulators 53–58 mounted to insulating tube 50 by means of central apertures in insulators 53–58 through which tube 50 extends. Conducting plate 51c is interposed between insulators 53 and 54, conducting plates 51a and 52a are interposed between insulators 54 and 55, conducting plates 51b and 52b are interposed between insulators 55 and 56, and conducting plate 52c is interposed between insulators 56 and 57, and conducting plates 51n and 52n are interposed between insulators 57, 58. Clamping bolt 60 extends through tube 50 with the head 61 (FIGURE 6) of bolt 60 positioned in cup 73 on the side of insulator 58 remote from the conducting plate 52n. Nut 62 is threadably mounted to bolt 60 and is positioned on the side of insulator 53 remote from conducting plate 51c. Suitable washers are interposed between insulators 53, 58 and members 62, 73, respectively.

With joint stack 33 mounted in operative position between bus duct sections 26, 27 plate 51c bridges the space between bus bars C' and C'–1, plate 51a bridges the space between bus bars A and A–1, plate 52a bridges the space between bus bars A' and A'–1, plate 51b bridges the space between bus bars B and B–1, plate 52b bridges the space between bus bars B' and B'–1, plate 52c bridges the space between bus bars C and C–1, plate 51n bridges the space between bus bars N and N–1, and plate 52n bridges the space between bus bars N' and N'–1. The tightening of nut 62 on bolt 60 provides a firm clamping pressure urging the conducting plates of joint stack 33 into good electrical engagement with the duct bus bars so that corresponding bus bars of ducts 26 and 27 are electrically connected to one another.

Splice plate 64 mounted to the top walls of the housing for duct sections 26, 27 by screw means 65, 66, respectively, mechanically secures sections 26, 27 to one another with the assistance of splice plate 67 mounted to the bottom walls of the housings for sections 26, 27 by screw means 68, 69, respectively. Splice plate 64 is formed with an aperture 71 defined by a depending hexagonal skirt 72 which engages nut 62 so as to prevent rotation thereof. Splice plate 67 is provided with circular aperture 74 defined by depending skirt 75 with the latter engaging cup 73. Thus, it is seen that skirts 72 and 75 prevent movement of joint stack 73 in a plane parallel to any of the conducting plates of joint stack 33. Further, skirt 72 prevents rotation of nut 62 so that by turning screw head 61 clamping pressure of stack 33 may readily be adjusted.

Naturally, the ends of adjacent duct housings, at the top and bottom walls thereof, are notched and cooperate with one another to form apertures 76, 77 to receive skirts 72 and 75, respectively. The duct housing side walls at the ends thereof are notched with the notches of adjacent sections cooperating to define aperture 78. Plate 79 is removably mounted so as to normally cover aperture 78.

Joint means 33 is readily inserted or removed without moving adjacent duct sections. More particularly, in order to remove joint means 33, cover 79 is removed so as to uncover aperture 78. Screw 60 is rotated to relax contact pressure, and splice plates 64 and 67 are removed. Now joint means 33 may be removed from the duct housing through aperture 78. The reverse process is required for inserting joint means 33. It is noted that the top and bottom of aperture 78 are somewhat enlarged by removing portions near the edges of the housing sidewalls and depending flange portions of the housing top and bottom walls. This provides clearance for the passage of screw head 61, nut 62 and insulators 53 and 58 into and out of the duct housing.

As seen in FIGURE 16, junction forming section 34 may readily be connected at the joint between adjacent aligned duct sections in place of joint stack 33. More particularly, junction forming section 34 is provided with an elongated housing of generally rectangular cross-section which corresponds substantially to the cross-section of duct housing 41–44. Extending longitudinally through housing 101 are a plurality of bus bars whose central portions are maintained in spaced relation by insulator means (not shown) similar to insulators 45, 46. The bus bar designations for junction forming section 34 are the same as those for the corresponding (same electrical connections) bus bars of duct section 26 with the suffix (–2) added.

The left ends of the bus bars of joint forming section 34 are offset and are combined with a plurality of generally plate-like insulators 53′–58′ mounted to through bolt 102 extending through an insulating tube (not shown), corresponding to tube 50, to form a joint stack which performs all of the functions of joint stack 33. In addition, the joint stack at the left of junction forming section 34, when in final mounting position at the joints between duct sections 27–28, positions the bus bars of junction forming section 34 at right angles to the bus bars of duct sections 27, 28 to form a T joint. Another joint stack means 33 electrically connects the right end of junction forming section 34 to branch duct section 36.

Junction forming section 35 is of identical construction to junction forming section 34. However, since the main straight duct run terminates at the right end of duct section 28, no duct bus bars come in at the right of section 28 to support the joint stack portion of junction forming section 35. Thus, termination 38 is provided with insulators of suitable metallic spacing members (not shown) insulated from one another to occupy the spaces in the joint normally occupied by duct section bus bars.

Tap forming section 29 (FIGURE 18) at the left end of duct section 21 is provided with a plurality of plate-like insulators 53″–58″ corresponding to the insulators of joint stack 33. It is noted that in the perspective view of FIGURE 18, tap forming section 29 is differently positioned than in FIGURE 1. For ready correlation of FIGURES 1 and 18, it is pointed out that insulator 53″ is at the top of the insulator stack 53″–58″. Tap forming section 29 also includes a plurality of bus bars with the reference numeral designations given thereto corresponding to those given to the bus bars of duct section 26 with the addition of the suffix (–3). Insulators 53″–58″ at the upper ends (with respect to FIGURE 18) of the bus bars in tap forming section 29 are mounted to through bolt 105 to form a joint stack. This stack electrically connects to the bus bars of duct section 21 at the left ends thereof in a manner substantially corresponding to that previously described in connection with joint stack 33 except that insertion and removal of tap forming section 29 is through the end opening in the housing for duct section 21 rather than through a side opening.

Naturally, cover plates placed over the end notches in the housing walls at the left of duct section 21 are of similar shape but not as long as splice plates 64, 67, and covers 79. However, the top and bottom cover plates have formations like skirts 72 and 75 to position the clamping bolt and nut.

A plurality of terminal strips 111, each carrying a table connector 112, are connected to one leg of U-shaped jumper 113 which electrically connects bus bars C–3 and C′–3. A plurality of terminal strips 114 each carrying a cable connector 115 are interposed between bus bars A–3 and A′–3 and are electrically connected to both of these bus bars. Similarly, a plurality of terminal strips 116 each mounting a cable connector 117 are interposed between bus bars B–3 and B′–3 to electrically connect these bus bars to one another while terminal strips 118, each having a cable connector 119 mounted thereto, are interposed between neutral bus bars N–3 and N′–3 to connect these bus bars to one another.

As should readily be apparent to those skilled in the art, tap forming section 29 may be utilized to introduce power to or tap power from bus duct system 20. While tap forming section 29 is electrically connected to all three phases and neutral of the bus duct, tap forming sections 30 and 32 are only connected to two phases and tap forming section 31 is only connected to two phases and neutral. As explained in the aforesaid Patent No. 2,287,502, in a paired phase system the bus bars of each phase should be tied together at the tapoff points as is done with the device of the instant invention.

Naturally, the covers 30a, 31a and 32a of tap forming sections 30–32, respectively, are constructed of insulating material. In view of the previous description, it should be obvious to those skilled in the art that the portions of tap forming sections 30–32 which extend into the duct housings include insulators and conducting plates where required mounted to a bolt extending through an insulating tube in a combination defining a joint stack of the type previously described.

Insulators 54–57 are of identical construction, while insulators 53 and 58 differ slightly from insulators 54–57. Insulator 54 is illustrated in detail in FIGURES 8 through 11. Insulator 54 is a rectangular, generally plate-like molded member provided with rectangular plateaus 121, 122 on opposite surfaces thereof with these plateaus being centrally located. Plateaus 121, 122 are separated by thin plate-like sections 123, 124 which extend in opposite directions and are offset from one another so as to present a somewhat Z-shaped profile, as seen in FIGURE 9, for purpose of which will hereinafter become apparent.

The surface of insulator 54 having plateau 121 is provided with rectangular protrusions 125, 126 extending from section 123 and protrusions 127, 128 extending from section 124. The opposite surfaces of sections 123 and 124 are provided with rectangular protrusions 125′–128′ aligned with protrusions 125–128, respectively. Elongated section 123 is provided with notches 127″, 128″ aligned with protrusions 127, 128, respectively, while section 124 is provided with rectangular notches 125″, 126″ aligned with protrusions 125, 126, respectively. Central aperture 130 extending through insulator 54 provides a passage for insulating tube 50. Protrusions 125–128, 125′–128′ and additional protrusions 131 serve to orient and block rotation of conducting plates 51c and 51a. The sloping surfaces of the additional protrusions 131 cooperate with the sloping portions of the bus bars adjacent to the offset ends to maintain insulator 54 in proper position with respect to the duct bus bars.

In a double stack arrangement of FIGURE 13, insulators 54a, 54b, of identical construction to insulator 54, are positioned side by side. Protrusions 125 and 126 of insulator 54b extend into notches 125″ and 126″ of insulator 54a in an interlocking arrangement to properly orient insulators 54a–54b with respect to one another with sufficient overlap existing to provide a proper insulation barrier between conducting plates 51′c and 51′a. It is noted that the conducting plates of the double stack arrangement of FIGURE 13 not only connect bus bars of adjacent duct sections but also connect bus bars in two different stacks of bus bars located in the same duct housing. Although not illustrated the conducting plates of FIGURE 13 are provided with appropriately positioned clearance holes to receive insulator projections 125–128. Since these clearance holes are not very extensive, the current carrying capacity at the joint is not materially affected.

It should be appreciated by those skilled in the art that for certain voltage ratings it is necessary to coat major portions of the electrical conducting elements with insulating material. However, this insulating material has not been shown since it would clutter the drawings and would not serve any useful purpose. It is noted that the end portions of the bus bars and portions to be engaged by plug-in fingers are not insulation covered.

Thus, this invention provides a novel bus duct construction in which removable joint stacks are provided for making electrical connections between adjacent duct sections. These joint stacks are formed as an assembly which is readily mounted or dismounted without the necessity of moving any duct sections. In some environments, the joint stack is part of an assembly which cooperates with duct sections to form an L or T junction and in some instances are part of an assembly for introducing power to or tapping power from the bus duct run. While the drawings for the most part illustrate a duct having eight bus bars, it should now be obvious to those skilled in the art that the invention may readily be carried out with ducts having different numbers of bus bars.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An electric distribution system including a plurality of bus duct sections operatively positioned with joints formed between adjacent sections, and a plurality of removable joint assemblies, one for each of said joints, electrically connecting said bus duct sections together at said joints; each of said sections including an elongated housing and a plurality of elongated bus bars disposed within said housing and extending generally parallel to the longitudinal axis thereof, a first and a second of said sections mounted in end to end relationship with each of said bus bars in said first section axially aligned with an individual bus bar of said second section and positioned to form an end space between the bus bars of said first and said second sections; a first of said removable joint assemblies when in an operative position electrically connecting the bus bars of said first and second sections; said first assembly being movable as a unitary structure to and from said operative position; said first assembly including a plurality of conducting splice plates, a plurality of insulators interposed between predetermined ones of said plates, a clamping bolt means extending through said plates and said insulators, and means insulating said bolt means from said plates and the bus bars of said first and second sections; said bolt means positioned in said end space and said plates extending across said end space to electrically connect bus bars of said first section to aligned bus bars of said second section, each of said insulators being an individual element of one piece construction.

2. An electric distribution system as in claim 1 in which the housings of said first and second sections have cooperating formations defining an aperture in the region of said end space, said aperture proportioned and positioned to permit removal of said first assembly while both said first and said second sections remain fixed.

3. An electric distribution system as in claim 2 in which the bus bars of each of said sections are at least six in number and are electrically connecting in paired phase relationship.

4. An electric distribution system as in claim 1 in which each of said plates is provided with an extension projecting transverse to the bus bars of said first and second sections, a third of said sections having its bus bars aligned with said extensions and positioned to form another end space between the bus bars of said third section and the end of said extensions remote from said end space, a second of said removable assemblies electrically connecting the bus bars of said third section to said extensions.

5. An electric distribution system as in claim 1 in which at least a first and a second of said plates are provided with an extension projecting transverse to the bus bars of said first and second sections; and cable grip means mounted on each of said extensions at the ends thereof remote from said end space.

6. A first and a second joint stack assembly for electrically connecting bus bars of adjacent bus duct sections; each of said assemblies including a plurality of conducting splice plates, a plurality of insulators interposed between predetermined ones of said plates, a clamping bolt means extending through apertures in said plates and said insulators, and means insulating said bolt means from said plates; each of said insulators being a thin plate-like member having first and second portions positioned in a first and a second plane, respectively; said planes being generally parallel and offset from one another; said assemblies mounted side by side with the first portions of said first assembly overlapping the second portions of said second assembly and positioned such that there is operative engagement cooperating interlocking formations of the first portions of said first assembly and the second portions of the second assembly.

7. A first and a second joint stack assembly for electrically connecting bus bars of adjacent bus duct sections; each of said assemblies including a plurality of conducting splice plates, a plurality of insulators interposed between predetermined ones of said plates, a clamping bolt means extending through apertures in said plates and said insulators, and means insulating said bolt means from said plates; each of said insulators being a thin plate-like member having first and second portions positioned in a first and a second plane, respectively; said planes being generally parallel and offset from one another; notch means formed in an edge of each of said portions and bosses projecting from said portions out of said planes; said aperture positioned closer to said bosses than to said notch means; said assemblies mounted side by side with bosses of the first portion of said first assembly extending into notch means of said second portion of said second assembly.

8. An electric distribution system including a plurality of bus duct sections operatively positioned with joints formed between adjacent sections, and a plurality of removable joint assemblies, one for each of said joints, electrically connecting said bus duct sections together at said joints; each of said sections including an elongated housing and a plurality of elongated bus bars disposed within said housing and extending generally parallel to the longitudinal axis thereof, a first and a second of said sections mounted in end to end relationship with each of said bus bars in said first section axially aligned with an individual bus bar of said second section and positioned to form an end space between the bus bars of said first and said second sections; a first of said removable joint assemblies electrically connecting the bus bars of said first and second sections; said first assembly including a plurality of conducting splice plates, a plurality of insulators interposed between predetermined ones of said plates, a clamping bolt means extending through said plates and said insulators, and means insulating said bolt means from said plates and the bus bars of said first and second sections; said bolt means positioned in said end space and said plates extending across said end space to electrically connect bus bars of said first section to aligned bus bars of said second section; each of said plates including an extension projecting transverse to the bus bars of said first and second sections, a third of said sections having its bus bars aligned with said extensions and positioned to form another end space between the bus bars of said third section and the end of said extensions remote from said end space, a second of said removable assemblies electrically connecting the bus bars of said third section to said extensions.

9. An electric distribution system as in claim 8 in which the second assembly includes a plurality of additional conducting splice plates, a plurality of additional insulators interposed between predetermined ones of said additional plates, an additional clamping bolt means extending through said additional plates and said additional insulators, and means insulating said additional bolt means from said additional plates, said extensions and the bus bars of said third section, said additional bolt means positioned in said additional end space and said additional plates extending across said additional end space to electrically connect bus bars of said third section to aligned extensions of said first assembly.

10. An electric distribution system as in claim 9 in which another housing surrounds said extensions, said housing of said third section and said another housing having cooperating formations defining another aperture in the region of said another end space, said another aperture proportioned and positioned to permit removal of said second assembly while both said third section and said first assembly remain fixed.

11. An electric distribution system as in claim 10 in which the housings of said first and second sections have cooperating formations defining an aperture in the region of said end space, said aperture proportioned and positioned to permit removal of said first assembly while both said first and said second sections remain fixed.

12. An electric distribution system including a plurality of bus duct sections operatively positioned with joints formed between adjacent sections, and a plurality of removable joint assemblies, one for each of said joints, electrically connecting said bus duct sections together at said joints; each of said sections including an elongated housing and a plurality of elongated bus bars disposed within said housing and extending generally parallel to the longitudinal axis thereof, a first and a second of said sections mounted in end to end relationship with each of said bus bars in said first section axially aligned with an individual bus bar of said second section and positioned to form and end space between the bus bars of said first and said second sections; a first of said removable joint assemblies electrically connecting the bus bars of said first and second sections; said first assembly including a plurality of conducting splice plates, a plurality of insulators interposed between predetermined ones of said plates, a clamping bolt means extending through said plates and said insulators, and means insulating said bolt means from said plates and the bus bars of said first and second sections; said bolt means positioned in said end space and said plates extending across said end space to electrically connect bus bars of said first section to aligned bus bars of said second section; at least a first and a second of said plates including an extension projecting transverse to the bus bars of said first and second sections; and cable grip means mounted on each of said extensions at the ends thereof remote from said end space.

References Cited

UNITED STATES PATENTS

| | | | |
|---|---|---|---|
| 3,004,096 | 10/1961 | Rowe | 174—88 |
| 3,180,924 | 4/1965 | Rowe | 174—88 |
| 3,183,298 | 5/1965 | Weimer et al. | 174—88 |

LARAMIE E. ASKIN, *Primary Examiner.*